July 28, 1925.

E. V. PRESTON 1,547,606

BAND SAW GUIDE

Filed April 3, 1922

Inventor
Elton V. Preston

By
Attorney

Patented July 28, 1925.

1,547,606

UNITED STATES PATENT OFFICE.

ELTON V. PRESTON, OF DETROIT, MICHIGAN.

BAND-SAW GUIDE.

Application filed April 3, 1922. Serial No. 549,266.

*To all whom it may concern:*

Be it known that I, ELTON V. PRESTON, a citizen of the United States, residing at Detroit, in the county of Wayne and State of Michigan, have invented certain new and useful Improvements in Band-Saw Guides, of which the following is a specification.

This invention has reference to a band saw guide for use when sawing pressed metal for various shapes as in auto-body work, although equally efficient for band saw work of general character.

The purpose and object of the invention is to provide means for reducing the right outside measurement of the saw guide to a convenient width for sawing pressed metal and providing for a simple and stable adjustment of the parts.

A further object of the invention is to provide a band saw guide of the character above specified that is simple in construction strong and durable and which it is deemed may be manufactured at a reasonably low cost.

Various other objects and advantages of the invention will become apparent from the continuance of the following description.

Figure 1:
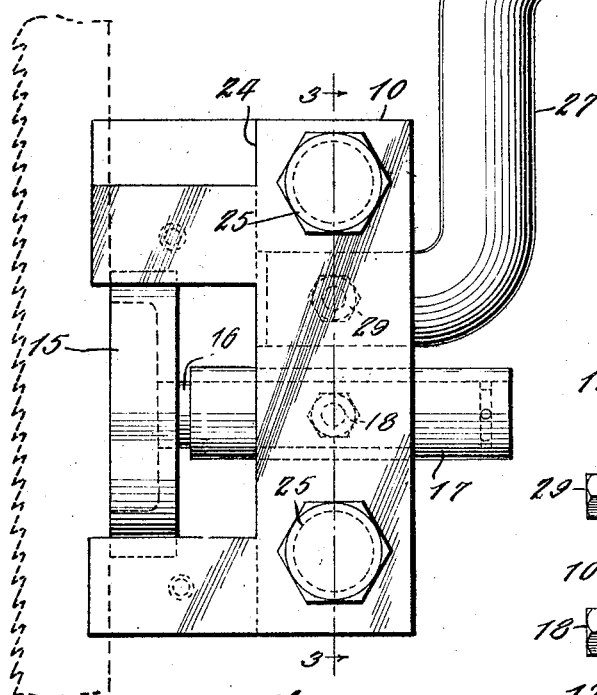
Figure 1 is a side view of the guide.
Figure 3:
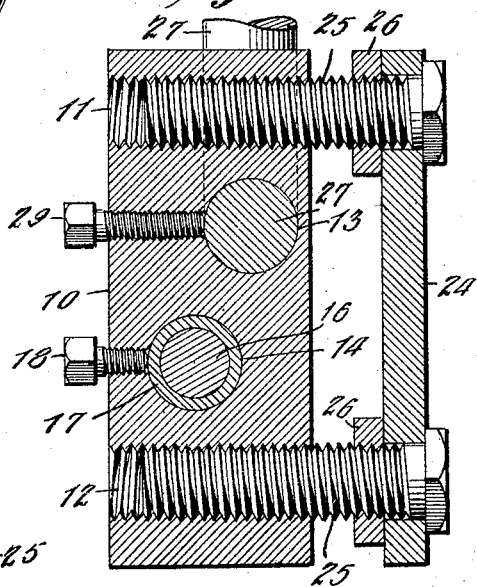
Figure 3 is a vertical cross section thereof taken on line 3—3 of Figure 1.
Figure 2:
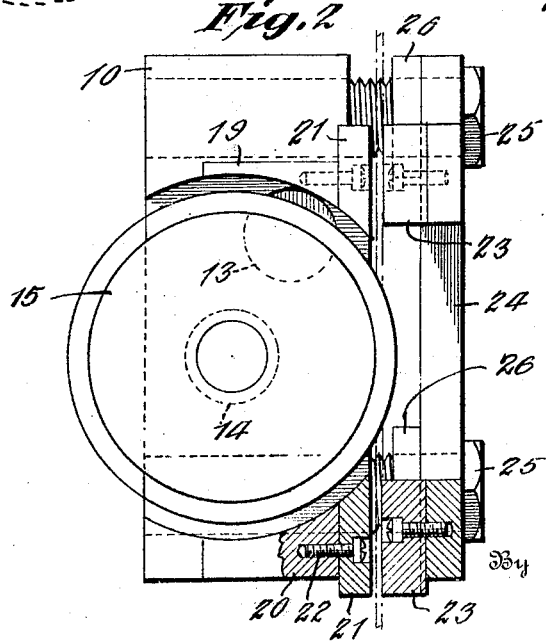
Figure 2 is a front view thereof.

This guide consists of a block or body portion 10 of steel or other suitable material having upper and lower threaded holes 11 and 12 respectively running therethru from side to side at right angle to the smooth bore openings indicated at 13 and 14. One face of block 10 is recessed to accommodate a thrust wheel 15 which has its shank or mandrel 16 mounted to turn within sleeve 17, which sleeve is slidable through opening 14 and locked securely in its adjusted position by set screw 18.

Parts 19 and 20 may be welded or otherwise made integral with block 10 and carry removable guide plates 21 held in place by screws 22. Arranged for cooperation with guide plates 21 are other guide plates 23 similarly fastened to an adjusting plate 24. Adjusting plate 24 is provided with threaded bolts 25 upon which it is securely held by jam nut 26. Bolts 25 engage in the openings 11 and 12 of block 10 and provide means for adjusting the guide to saws of different gauge, the wheel 15 being moved back or forth according to the width of saw used at any particular time. To facilitate the lining up of the guide with the saw a goose neck 27 is provided with one end engaged in opening 13 of the guide and its opposite end inserted in an opening in post 28 which constitutes part of a band saw machine. Adjustable locks screws 29 and 30 respectively bind against the opposite ends of the goose neck and serve to hold the latter in any angular position between the post and the guide, thereby enabling the guide to be readily lowered and lined up with the saw much closer to the work than has heretofore been found practicable.

The band saw machine to which the invention is to be applied is of the usual type consisting of an endless saw running on two wheels on separate shafts and the saw guide is positioned and adjusted with respect to the saw blade so that the latter travels vertically between the guide plates 21 and 23 with its rear edge bearing against the face of wheel 15. By reason of the rigid upper and lower guide plates engaging opposite sides of the saw blade, the latter is held in position from side pressure while the wheel 15, against which the rear edge of the saw blades bears, counteracts the pressure from the front or toothed edge of the saw and prevents it from working back and running off of the wheel of the machine. While the saw is in motion the wheel 15 revolves at rapid speed, being actuated by the movement of the saw blade across its face, and protects the saw from rubbing against any stationary metal in addition to preventing crystallization of the saw blade or cracks therein. The provision of the adjusting plate on the right side of the saw guide which is relatively thin and which occupies but a minimum space enables the saw guide to be reduced on the right side to the smallest possible measurement which is consistent with retaining strength and stability. This reduced narrow measurement on outside of the saw guide to the right of the saw allows for much better work when sawing pressed metal since it permits a straight cut on flanged metal instead of having to saw it at an angle, as is generally required to be done with the saw guides heretofore used.

This saw guide may be readily set up and adjusted to any band saw and when once set in position the parts may be securely locked and held against displacement. When in use it does away with the excessive width of saw guide on the right side when sawing pressed metal and enables adjustment to be readily and conveniently made.

From the foregoing it is believed that the advantages and novel features of the invention can be readily understood and that further description is unnecessary.

What is claimed is:

1. A band saw guide comprising a metallic block having a pair of smooth bore openings and a pair of relatively upper and lower threaded holes, the latter extending through the block from side to side at right angles to the said smooth bore openings, said block being further provided with a recess at one end, a sleeve mounted to turn within one of the said smooth bore openings, a thrust wheel disposed within the said recess of the block and having an integral shank mounted to turn with the said sleeve, an adjusting plate, fastening means carried by said adjusting plate and threadedly engaged in the said threaded holes of the block to permit adjustment of the said plate to accommodate saws of different gages, upper and lower guide plates carried by the said block, upper and lower guide plates carried by the said adjusting plate for co-operation with the guide plates of the said block, a post spaced outwardly from the said block, an angularly adjustable gooseneck having one end engaged in the other smooth bore opening of the block and its other end inserted in an opening in the said post, and adjustable lock means at the opposite ends of the gooseneck serving to hold the latter in any angular position in a plane normal to the cutting plane of the saw.

2. A saw guide for a band saw machine comprising a block, an adjusting plate on one side of the said block and being relatively thin, guide plates carried by the said block and the said adjusting plate and between which the band saw is adapted to pass, a thrust wheel journaled in the front face of the block and presenting a bearing surface against which the rear edge of the saw is adapted to bear, adjusting bolts at the upper and lower ends of the said adjusting plate and engaged in threaded openings in the said block and jam nuts on the said bolts for locking the adjusting plate in position thereon.

3. A band saw guide comprising relatively stationary and adjustable members between which the saw is adapted to pass, the said stationary member consisting of a block having approximately plane front, back and side faces and presenting a pair of relatively upper and lower threaded holes extending through the block from one side thereof to the other, the said adjustable member consisting of a flat plate disposed adjacent one of the plane sides of the said body and being of such narrow cross section as to occupy but a minimum space on the outside of the cutting plane of the saw, headed adjusting members having screw-shanks passing through the said plate and engaged in the threaded holes of the said body, means on the screw-shanks of the said locking members for locking the said plate in position thereon, a thrust wheel mounted in a recess in the front face of the body and presenting a bearing for the rear edge of the saw, guide plates fixed to the said body above and below the said thrust wheel for engaging the inner side of the saw, and supplemental guide plates carried by the said flat plate for engaging the outer side of the saw.

In testimony whereof I affix my signature.

ELTON V. PRESTON.